US007977395B2

(12) United States Patent
Lin et al.

(10) Patent No.: US 7,977,395 B2
(45) Date of Patent: Jul. 12, 2011

(54) ELECTRONICALLY AND IONICALLY CONDUCTIVE POROUS MATERIAL AND METHOD FOR MANUFACTURE OF RESIN WAFERS THEREFROM

(75) Inventors: YuPo J. Lin, Naperville, IL (US); Michael P. Henry, Batavia, IL (US); Seth W. Snyder, Lincolnwood, IL (US)

(73) Assignee: UChicago Argonne, LLC, Chicago, IL (US)

( * ) Notice: Subject to any disclaimer, the term of this patent is extended or adjusted under 35 U.S.C. 154(b) by 456 days.

(21) Appl. No.: 12/288,554

(22) Filed: Oct. 21, 2008

(65) Prior Publication Data

US 2009/0093556 A1 Apr. 9, 2009

Related U.S. Application Data

(62) Division of application No. 11/082,468, filed on Mar. 17, 2005, now Pat. No. 7,452,920.

(51) Int. Cl.

| | |
|---|---|
| ***H01B 1/24*** | (2006.01) |
| ***C08J 5/22*** | (2006.01) |

(52) U.S. Cl. .............. 521/65; 521/70; 521/83; 521/142; 521/143; 435/180; 204/524; 204/525; 204/533; 204/536

(58) Field of Classification Search .................... 521/66, 521/70, 83, 142, 143; 435/180; 204/524, 204/525, 533, 536

See application file for complete search history.

(56) References Cited

U.S. PATENT DOCUMENTS

| | | | |
|---|---|---|---|
| 5,593,563 | A | 1/1997 | Denoncourt et al. |
| 5,868,915 | A | 2/1999 | Ganzi et al. |

FOREIGN PATENT DOCUMENTS

| | | |
|---|---|---|
| WO | WO 01/12292 | 2/2001 |

*Primary Examiner* — Irina S Zemel

(74) *Attorney, Agent, or Firm* — Olson & Cepuritis, Ltd.

(57) ABSTRACT

An electrically and ionically conductive porous material including a thermoplastic binder and one or more of anion exchange moieties or cation exchange moieties or mixtures thereof and/or one or more of a protein capture resin and an electrically conductive material. The thermoplastic binder immobilizes the moieties with respect to each other but does not substantially coat the moieties and forms the electrically conductive porous material. A wafer of the material and a method of making the material and wafer are disclosed.

10 Claims, 4 Drawing Sheets

ELECTRONICALLY AND IONICALLY CONDUCTIVE POROUS MATERIAL AND METHOD FOR MANUFACTURE OF RESIN WAFERS THEREFROM

CROSS REFERENCE TO RELATED APPLICATIONS

This application is a divisional of U.S. patent application Ser. No. 11/082,468 filed Mar. 17, 2005, now U.S. Pat. No. 7,452,920, the disclosure of which is incorporated by reference in its entirety.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

FIELD OF THE INVENTION

The present invention relates to new electrically and ionically conductive material, resin wafers for use in a variety of devices and methods of making same.

BACKGROUND OF THE INVENTION

In U.S. Pat. No. 6,495,014, the entire disclosure of which is incorporated by reference, there was described an ion-exchange resin wafer designed for use in an electrodeionization (EDI) process. The ion-exchange resin wafer disclosed in the '014 patent overcame internal fluid leakage problems. The resin wafer technology enabled the application of EDI technology to desalination of chemical products. The '014 patent described a detailed method to fabricate wafers using latex binders through a polymerization process. U.S. patent application publication nos. 2004/0060875, now U.S. Pat. No. 6,797,140 issued Sep. 28, 2004 and 2004/0115783, the disclosures of which are herein incorporated by reference, relate to latex wafers and devices incorporating same. The inventive resin wafers herein described greatly increase the performance of the devices disclosed in these patents and application, as well as new devices and uses disclosed in co-pending application Ser. No. 11/082,469, filed on even date herewith entitled "Devices Using Resin Wafers and Applications Thereof".

The wafers using latex binders described in the '014 patent were adequate for their intended purpose but there was a problem in the length of time it took to make those wafers due to the setting times for the latex binding material as well as the separation and capture efficiencies in enzymatic bioreactors using these wafers.

Accordingly, there is a need in this art for material which will increase the separation and capture efficiency for enzymatic bioreactors as well as new methods for manufacturing wafers to accommodate commercial production requirements.

In investigating ways to improve wafers of the type described in the '014 patent, it was found that new wafers could be made with improved characteristics more quickly and efficiently than previously by the use of thermoplastic binders such as polyethylene rather than latex and when combined with an electrically conducting material, provided not only improved characteristics with respect to the prior art wafers made with latex binders but also enabled the new material in the form of wafers to be used in additional devices.

SUMMARY OF THE INVENTION

Accordingly, it is an object of the present invention to provide a new material including resin beads in a thermoplastic binder useful in a variety of devices such as electrodeionization, separative bioreactors, in the production of organic acids or amino acids or alcohols or esters or for regenerating cofactors in enzymes or microbial cells as well as useful in enzyme and/or whole cell based biofuel cells for electricity generation during the operation of the biofuel cell.

Another object of the present invention is to provide thin electrically and ionically conductive porous wafers in which a thermoplastic binder immobilizes the anion and/or cation or protein capture resins with respect to each other but does not substantially coat the moieties and forms the electrically and ionically conductive porous material.

Yet another object of the invention is to provide an electrically and ionically conductive porous material, comprising a thermoplastic binder and one or more of anion exchange moieties or cation exchange moieties or mixtures thereof and/or one or more of a protein capture resin and an electrically conductive material.

A further object of the invention is to provide an electrically and ionically conductive porous material, comprising a thermoplastic binder and one or more of anion exchange moieties or cation exchange moieties or mixtures thereof and/or one or more of a protein capture resin and an electrically conductive material, wherein said thermoplastic binder immobilizes the moieties with respect to each other but does not substantially coat the moieties and forms the electrically conductive porous material.

A still further object of the invention is to provide a thin wafer of electrically and ionically conductive porous material, comprising a mixture of a thermoplastic binder and one or more of anion exchange moieties or cation exchange moieties or mixtures thereof and/or one or more of a protein capture resin and an electrically conductive material into a mold, wherein said anion and/or cation exchange moieties are present in the range of from about 30% to about 75% by weight of the material and wherein said thermoplastic binder is present in the range of from about 25% to about 70% by weight of the material and said electrically conductive material is one or more of carbon black or glassy carbon particles or glassy carbon nanoparticles and is present in the range of from about 1 to about 15% by weight of the electrically and ionically conductive flexible and porous material.

A final object of the invention is to provide a method of forming an electrically and ionically conductive flexible and porous material, comprising providing a mixture of a thermoplastic binder and one or more of anion exchange moieties or cation exchange moieties or mixtures thereof and/or one or more of a protein capture resin and an electrically conductive material, subjecting the mixture to temperatures in the range of from about 60° C. to about 170° C. at pressures in the range of from about 0 to about 500 psig for a time in the range of from about 1 to about 240 minutes to form the electrically conductive flexible and porous material.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
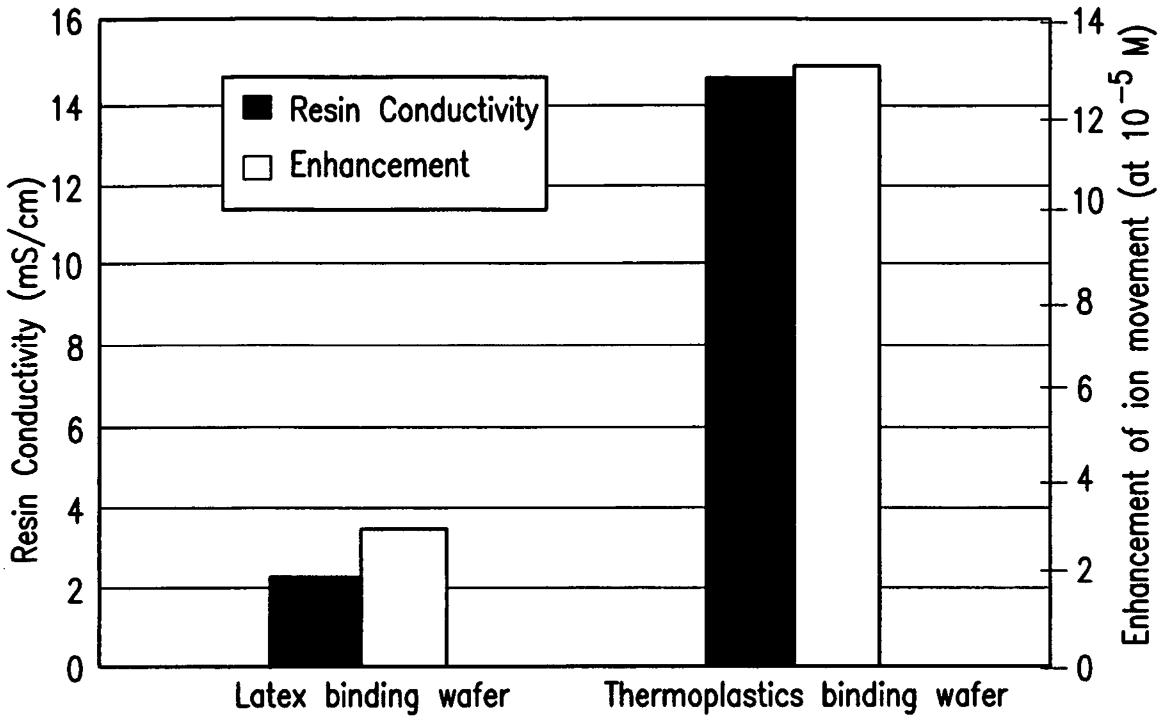
FIG. 1 is a graph showing the comparison of resin conductivities in different type I wafers as well as the enhancements of ion movement by type I wafers in very dilute NaCl solutions ($10^{-5}$ M)

This invention describes an electrically and ionically conductive porous material with a thermoplastic binder and a method to immobilize ion-exchange (IX) resin beads with or without other chemical entities or particles to form a composite resin wafer. Other chemical entities or particles that have been included in the resin wafer are: protein binding beads, carbon black or glassy carbon. The ion exchange resins include both anion and cation resin particles and mixtures of the two. The thermoplastic binders include but are not limited to polypropylene and/or polyethylene polymers. The mixture is placed into a mold and compressed using a compressing die then heated to form a wafer. The weight percent of resins in the material is variable but generally in the range of from about 30 to about 75% by weight. In addition during the fabrication, the temperature, pressure, time of fabrication, gas or vapor flow-through rate and/or the amount of material incorporated into the resin wafer can be adjusted. By controlling these conditions or methods of fabrication, the chemical and physical properties of the composite resin wafer can be altered. These properties include durability, porosity, conductivity, chemical specificity and biochemical specificity. The resin wafers of the present invention are useful in an electrodeionization system for water purification, products desalination, single-stage reaction and separation (capture) of charged products, and secondary ion exchange resin catalytic reactions (e.g., esterification). By incorporating protein binding beads such as nickel chelated resins as well as other protein binding resins set forth in the incorporated patents and applications, proteins can be immobilized in the porous resin wafers for enzymatic conversions. By incorporating carbon black or other electric conductive particles, the resin wafer can be useful for integrated ion and electron carrying. Applications of resin wafers with integrated ion and electron carrying capacity include: biofuel cells, catalytic water-splitting for hydrogen production and enzyme cofactor regeneration.

In the current fabrication examples, low and high molecular weight polyethylene polymers with different particle sizes have been used to make the wafers. Molding temperature has been varied from about 60-170° C. depending on the grade of polyethylene used in the process. The molding time is in the range of 1 to about 240 minutes. Molding pressure is in the range of 0 to about 500 psig. The porosities of the wafer are controlled by either steam formed during the heating or by a heated gas or vapor flowing through the mold or by including removable additives such as, but not limited to, dry sugar that can be removed from the cured wafer by water or other solvents. The polymer binder is preferably in the range of 25-70% by weight of the material. The amount of water soluble additives such as sugar that are added initially in the mix to control the wafer porosity preferably is in the range of 10-30 volume % of total initial mixed bead material. By including shims in the mold, the thickness of wafer can be controlled in the range of 1.0 mm to more than 12 mm.

Varying the mixing ratios of the binding polymers, different functionalities of porous wafers were made. The first kind of water (type I) was made with pure ion-exchange (IX) resin beads, either cation or anion or the mixture of cation and anion resin beads. The second kind of wafer (type II) was an immobilized mixture of IX resin beads with protein capture beads of Ni-charged polymers. The third kind of water (type III) was a mixture of cation resin beads with carbon black or glassy carbon nanoparticles, preferably having an average diameter of less than about 100 nanometer (nm). The fourth kind of water (type IV) is an immobilized mixture that contains IX resin beads, carbon nanoparticles and protein capture beads.

In examples of the present invention, IX resin beads used were PFC100E and PFA444 from Purolite with uniform particle size in the range of 400-600 micrometers (μm). The polymer binder used in the wafer was either the ultra-high molecular weight (melting point 145° C.) 100° C. micrometers polyethylene polymer particles purchased from Aldrich or the low-molecular weight (melting point around 120° C.) 400 or 1000 micrometers polyethylene polymer particles purchased from Alfa-Aesar. The protein binding resin beads were ®Ni-NTA Superflow (50 micrometers particle size) from Qiagen. Carbon black and glassy carbon powder with 10-20 nm size was obtained from, Alfa-Aesar. The amount of material (i.e., the beads) used to make a wafer was in the range of 0.7-1.4 g/$cm^3$ of wafer volume.

Figure 2:
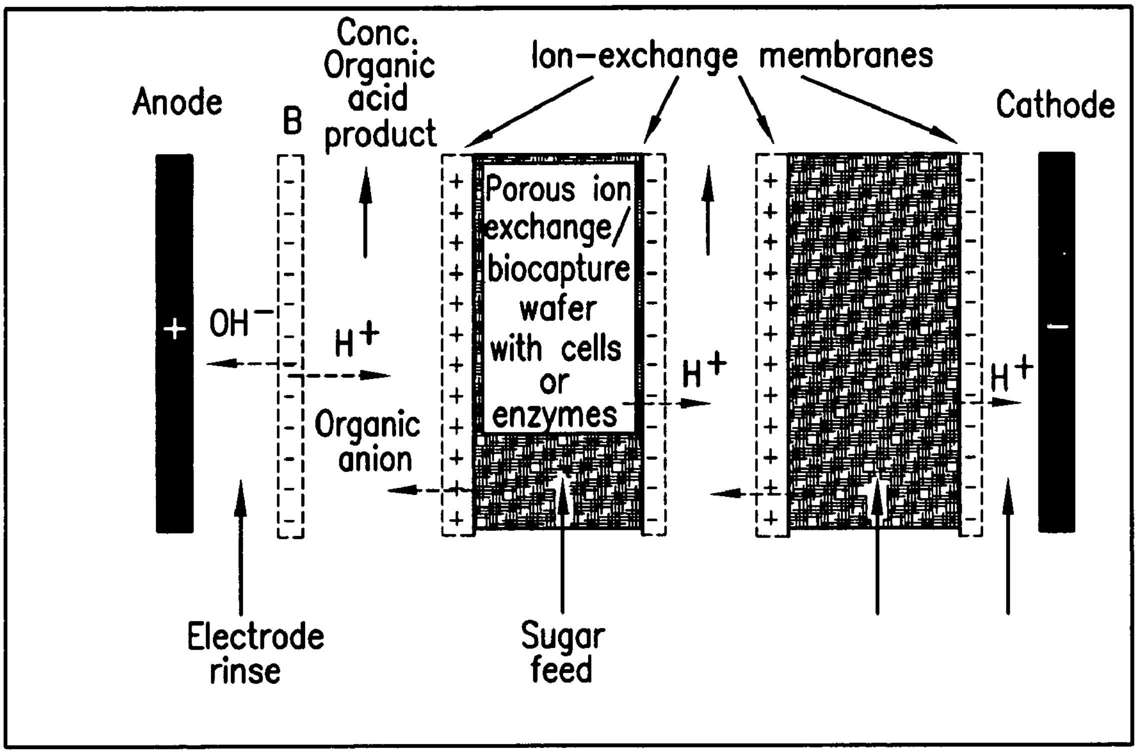
FIG. 2 is a schematic representation of a device using the wafers of the present invention for organic acid production.

FIG. 1 shows the resin conductivities of type I resin wafers (i.e., contains only ion-exchange resin beads and the polymer binders). The hot-press method, as will be described, exhibits almost 10-fold higher ionic conductivity for the wafer compared to the latex binding method (i.e., using a latex solution). The wafer made by the hot-press method also exhibited significant enhancement in ionic movement in very dilute NaCl solutions (8-fold increase). Porosity of the wafer made by the new method was increased up to about 35-60% in comparison to 15% in the latex binding wafers, FIG. 1). When used in a desalination electrodeionization device such as shown in U.S. Pat. No. 6,495,014, the improved properties of high ionic conductivity and porosity significantly enhances the desalting efficiency. FIG. 2 shows a schematic of desalting electrodeionization (DSED) using the resin wafer. In a DSED, type I resin wafer is inserted in the dilute compartments which is formed by a pair of cation and anion exchange membranes. The salts in a process stream are fed into the dilute compartment and transferred electrochemically across the membranes into the concentrate compartments, all as is known in the art.

Figure 3:
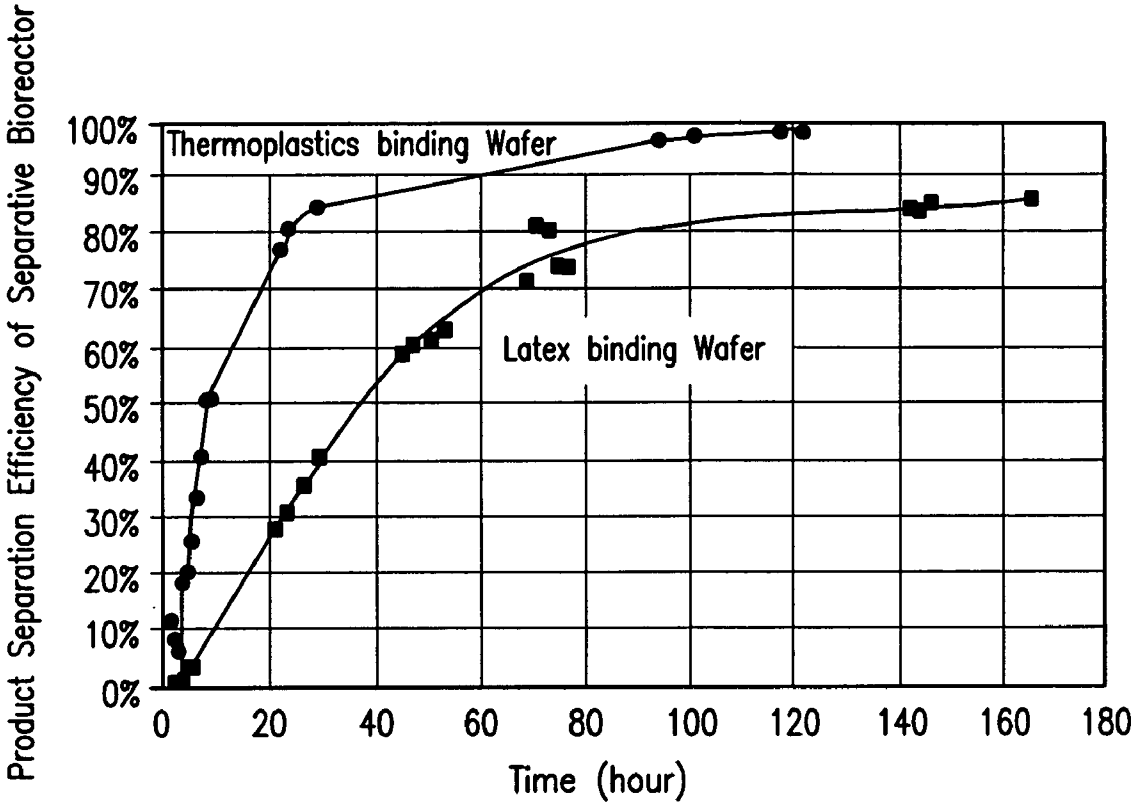
FIG. 3 is a graph showing the separation and capture efficiencies of gluconic acid from enzymatic bioreactors using the inventive resin wafers with a protein binder.

A type II wafer (i.e., contains ion-exchange resin beads and protein binding beads and polymer binders) can be used in an enzymatic bioreactor to produce gluconic acid from a glucose-fructose-oxido-reductase (GFOR) enzyme immobilized in the type II resin wafers. Type II resin wafers made from the new wafer fabrication technology significantly improves the separation and capture efficiency of the organic acid products compared with the wafer used in a previous wafer based bioreactor with the wafers made in accordance with U.S. Pat. No. 6,979,140. FIG. 3 shows a graphical comparison of capture efficiency for gluconic acid using the latex binding wafer with the inventive wafer in a Separative Bioreactor. These data indicate that the new material and wafer and method of fabricating enhance the biological product separations.

Figure 4:
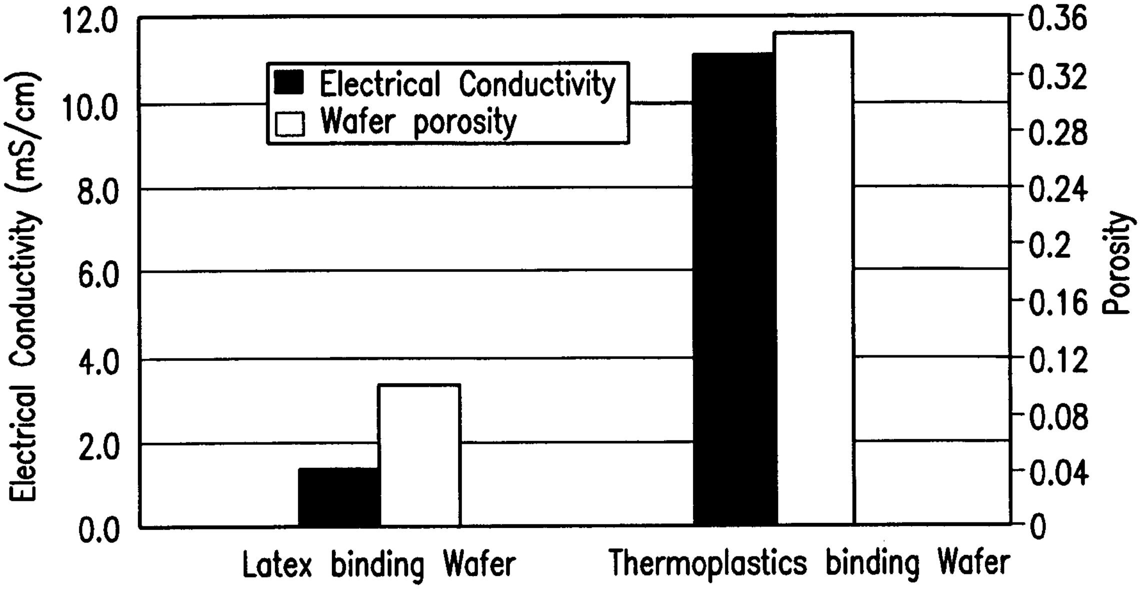
FIG. 4 is a graph showing the relationship between electrical conductivity and porosity for wafers which are a mixture of cation resin beads with carbon black or glassy carbon nanoparticles for both latex and thermoplastic binders.

Type III—and IV wafers (i.e., contains carbon black particles, ion-exchange resin beads (-type III) and/or protein binding beads (type IV) and—the polymer binders) can simultaneously conduct electrons and transportions. FIG. 4 shows the electrical conductivity and porosity of the inventive wafer compared to the resin wafer made from latex binding. The inventive wafer exhibits superior physical properties and performance with above 35% porosity and with a 10-fold increase in electrical conductivity. Type III and IV wafers can be used as a platform for the applications of an electrochemical regeneration of enzyme cofactor or other devices described in more detail in the co-pending application filed on even date.

As seen therefore, there has been provided an electrically and ionically conductive porous material. The porous material includes a thermoplastic binder which is preferably but not necessarily polyethylene and in which the binder is present in the range of from about 25% to about 70% of the weight of the material. The electrically and ionically porous material is preferably in the form of a thin wafer having a thickness in the range of from about 1 to about 12 millimeters and may include anion and/or cation exchange moieties or mixtures thereof which are usually present in the range of from about 30% to about 75% of the wafer weight. A protein capture resin such as previously described in the incorporated material may be used, but preferably a nickel-charged resin may be present as well as electrically conductive material in the form of nanoparticles preferably having a average diameter of less than about 100 nanometers. In general, the porous material has a porosity greater than about 15% and up to about 60%.

The thin wafers of the present invention may be interposed between ion exchange membranes forming product in the reaction chambers intermediate a cathode and an anode to provide a separative bioreactor or a biofuel cell or an electrochemical regenerator for an enzyme cofactor. In such devices, a mechanism is required for applying a potential across the anode and cathode, as is well known in the art. In addition, the wafers may be made by subjecting either dry mixtures of the ion exchange material and the thermoplastic material in a mold to temperatures in the range of from about 60° C. to about 170° C. at pressures in the range of from about 0 to about 500 psig for a time in the range of from about 1 to about 240 minutes to form the thin wafers wherein the thermoplastic binder immobilizes the moieties with respect to each other but does not substantially coat the moieties. In addition, slurries may be injected into molds, wherein water, alcohol, surfactants (or mixtures thereof) may be used as the liquid portion of the slurry.

The electrically conductive materials which may be one or more of carbon black or glassy carbon particles or nanoparticles are preferably present in the range of from about 1 to about 10% by weight of the material and in general, the thermoplastic binder preferably has a melting point in the range of from about 100° C. to about 140° C. When the thermoplastic binder is polyethylene, it is preferably present in a range of from about 25% to about 70% by weight of the material. Preferably, the ion exchange material is initially present as resin beads having a size in the range of from about 10 micrometers to about 1200 micrometers and the thermoplastic polymer in the form of resin beads in the range of from about 1% to about 75% either larger or smaller than the ion exchange resin beads. The thin wafers positioned between an anode and a cathode may form reaction and product chambers for electrodeionization, or for separative bioreactors, or for the production of organic acids or amino acids or alcohols or esters or for regenerating cofactors and ions and enzymes or in microbial cells. Where the thin wafers are positioned as an anode material between an anionic current collector and a cathode and an enzyme and/or whole cell based biofuel cell, then electricity is generated during operation of the biofuel cell.

While the invention has been particularly shown and described with reference to a preferred embodiment hereof, it will be understood by those skilled in the art that several changes in form and detail may be made without departing from the spirit and scope of the invention.

What is claimed is:

1. A method of forming an electrically and ionically conductive flexible and porous material, comprising providing a mixture of a thermoplastic binder and one or more of anion exchange moieties or cation exchange moieties or mixtures thereof and/or one or more of a protein capture resin and an electrically conductive material, subjecting the mixture to temperatures in the range of from about 60° C. to about 170° C. at pressures in the range of from about 0 to about 500 psig for a time in the range of from about 1 to about 240 minutes to form the electrically conductive flexible and porous material.

2. The method of claim 1, wherein removable material is included in the mixture during formation of the material, and further including removing the removable particles to provide porosity to the material.

3. The method of claim 1, wherein removable material is one or more of sugar or salt or wax or camphor or mixtures thereof.

4. The method of claim 1, wherein removable material is water soluble and/or vaporized and/or sublimated and/or melted to remove the material.

5. The method of claim 4, wherein the anion exchange moieties or cation exchange moieties or mixtures thereof are initially present as resin beads having a size in the range of from about 10 micrometers to about 1200 micrometers.

6. The method of claim 5, wherein the polymer is initially present as resin beads having a size in the range of from about 1% to about 75% either larger or smaller than the ion exchange resin beads.

7. The method of claim 6, wherein the electrically conductive flexible and porous material has a porosity in the range of from about 15% to about 60% and the electrically conductive material is present in the range of from about 1% to about 15% by weight of the electrically conductive flexible and porous material and the anion exchange moieties or cation exchange moieties or mixtures thereof are present in the range of from about 30% to about 75% by weight of the material and the thermoplastic binder is present in a range of 25%-70% by weight of the material.

8. The method of claim 7, wherein one or more protein capture resins are present.

9. The method of claim 1, wherein the mixture is dry or a slurry.

10. The method of claim 9, wherein the slurry contains one or more of water, alcohol, or a surfactant.

* * * * *

UNITED STATES PATENT AND TRADEMARK OFFICE

CERTIFICATE OF CORRECTION

PATENT NO. : 7,977,395 B2
APPLICATION NO. : 12/288554
DATED : July 12, 2011
INVENTOR(S) : YuPo J. Lin et al.

It is certified that error appears in the above-identified patent and that said Letters Patent is hereby corrected as shown below:

Column 1, line 47, delete “11/082,469” and insert -- 11/082,468 --.

Column 4, line 14, delete the word “water” and insert --wafer--.
line 18, delete the word “water” and insert --wafer--.
line 22, delete the word “water” and insert --wafer--.
line 48, delete “Figure 1)” and insert --Figure 1--.

Column 5, line 2, delete “6,979,140” and insert --6,797,140--.
line 10, delete the word “transportions” and insert --transport ions--.

Signed and Sealed this
Eighteenth Day of October, 2011

David J. Kappos
*Director of the United States Patent and Trademark Office*